United States Patent [19]
Nakamura

[11] Patent Number: 5,812,866
[45] Date of Patent: Sep. 22, 1998

[54] PARALLEL PROCESSOR WITH CONTROLLABLE RELATION BETWEEN INPUT AND OUTPUT DATA

[75] Inventor: Kenichiro Nakamura, Saitama, Japan

[73] Assignee: Sony Corporation, Japan

[21] Appl. No.: 546,769

[22] Filed: Oct. 23, 1995

[30] Foreign Application Priority Data

Oct. 27, 1994 [JP] Japan .................................. 6-287509

[51] Int. Cl.⁶ .................................................. G06F 15/80
[52] U.S. Cl. .................................... 395/800.01; 395/885
[58] Field of Search ........................ 395/200.38, 200.43, 395/200.68, 800.01, 840, 841, 849, 853, 872, 878, 880, 885, 891, 294; 382/232, 254, 276

[56] References Cited

U.S. PATENT DOCUMENTS 4,075,691  2/1978  Davis et al. ............................. 395/884
4,490,784  12/1984  Ives et al. ............................... 395/250
5,475,831  12/1995  Yoshida et al. ......................... 395/500
5,564,061  10/1996  Davies et al. ........................... 395/884

OTHER PUBLICATIONS

SVP: Serial Video Processor, IEEE 1990 Custom Integrated Circuits, Jim Childers; Peter Reinecke.

Primary Examiner—Alpesh M. Shah
Attorney, Agent, or Firm—Ronald P. Kananen

[57] ABSTRACT

In a parallel processor device, at the time specified data is converted to parallel data by the specified unit and processed in parallel and then outputted as serial data, the data is processed and outputted in an arbitrary skipping manner without the necessity of the high speed clock signal. The first pointer mode control means 21 for controlling the address of data writing into data input register is provided, and the number and the interval of the first data when the first data is inputted to the data input register is controlled.

7 Claims, 17 Drawing Sheets

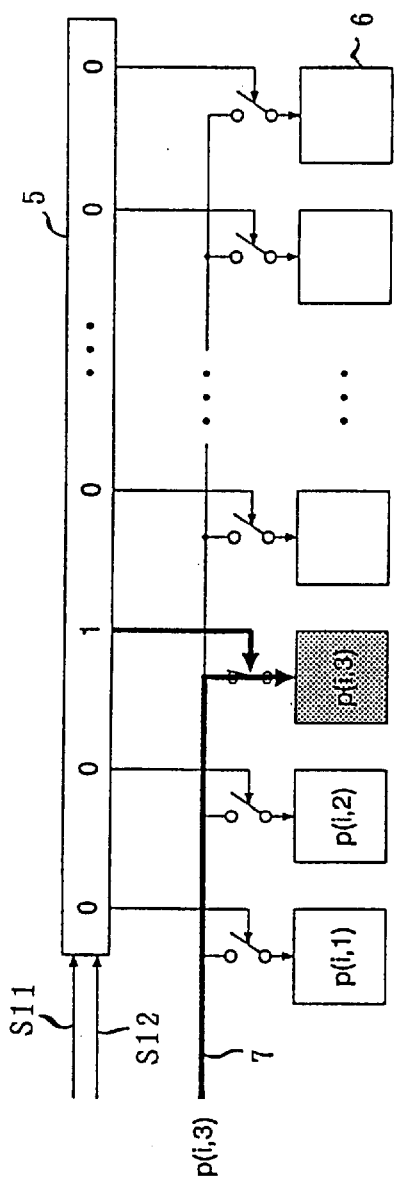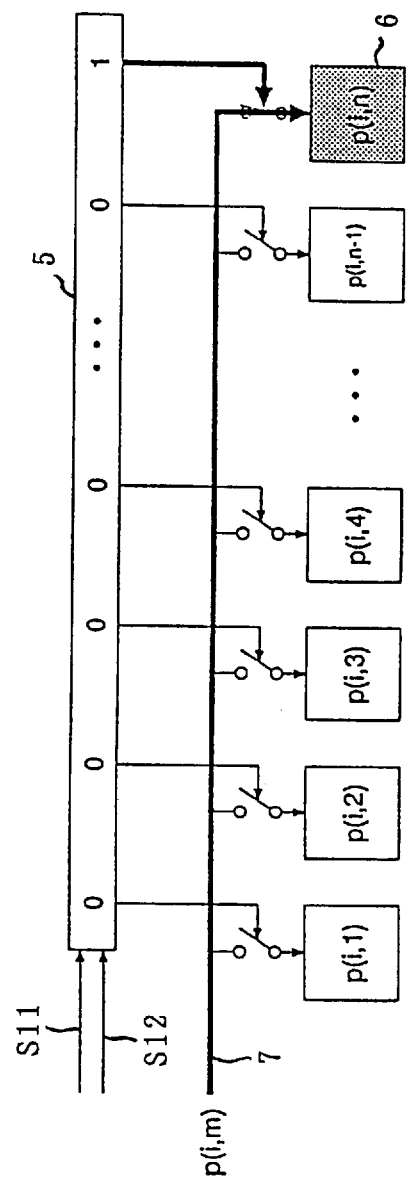
FIG. 8A (RELATED ART)
FIG. 8B (RELATED ART)

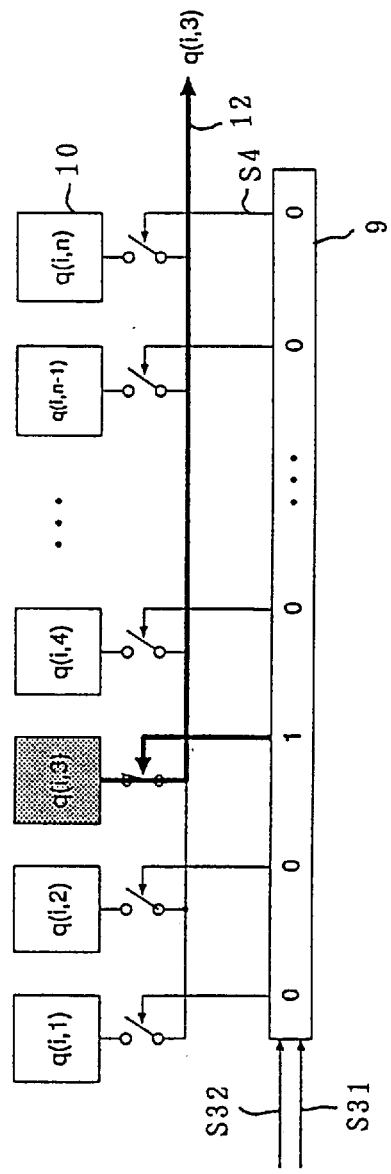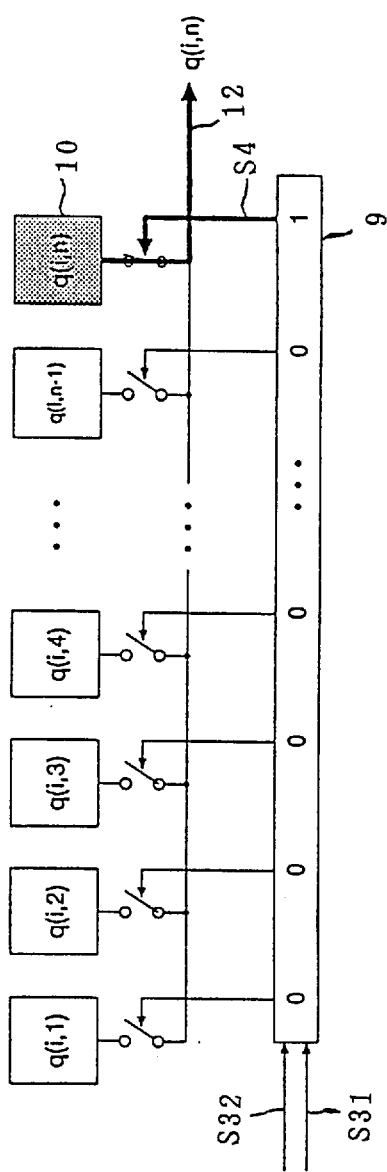
FIG. 10A (RELATED ART)
FIG. 10B (RELATED ART)

PARALLEL PROCESSOR WITH CONTROLLABLE RELATION BETWEEN INPUT AND OUTPUT DATA

BACKGROUND OF THE INVENTION

1. Field of the Invention

This invention relates to a parallel processor device, and more particularly to an improvement of a parallel processor device which is utilized for digital processing of video signals.

2. Description of the Related Art

In the field of signal processing of image data, all of pixels which compose one picture are subjected to the similar operation, in many cases. With the purpose of executing the same operation against the large quantity of data at high speed, SIMD (Single Instruction Multiple Data stream) style architecture has been proposed and utilized in broad fields as well as the field of image signal processing. SIMD style architecture is constituted such that the required number of processing units are arranged, and the respective processing units operate in accordance with the same instruction. Therefore, if the individual data are given to the respective processing units, the results of the operation to the respective data are obtained at once. As an exemplary application of SIMD style processing unit to image processing, there is a device which is shown in SVP (SERIAL VIDEO PROCESSOR/Proceedings of the IEEEE 1990 CUSTOM INTEGRATED CIRCUITS CONFERENCE /P17 3.1–4), and the SVP shown in U.S. Pat. No. 4,939,575.

To be concrete, this device is constituted by, for instance, the parallel processor 1 shown in FIG. 1. In this figure, the reference numeral 2 shows a data input register (hereinafter, it is referred to as a DIR) which sequentially receives inputted pixel data of the amount of one scanning line through a serial data input $S_{IN}$. The reference numeral 3 shows plural processor elements (hereinafter, it is referred to as a PE) for parallel processing the pixel data of the amount of one scanning line. The reference numeral 4 shows a data output register (hereinafter, it is referred to as a DOR) for sequentially outputting the processed pixel data of the amount of one scanning line to a serial data output $S_{OUT}$.

A procedure of processing an image data which is composed of m×n pixels, that is, p(1, 1)–p(m, n) shown in FIG. 2 with such a parallel processor 1 is explained hereinafter using FIGS. 4A to 4C. A pixel p(i, j) of which i and j are arbitrary (where, $1 \leq i \leq m$, $1 \leq j \leq n$) may be represented with plural bits. Scanning of the image is usually performed in accordance with the order of from left to right and from top to bottom, therefore, the image data is generally transmitted with the structure shown in FIG. 3. Where, the time needed to scan the pixel data of an amount of one line is referred to as a horizontal period. The time needed to return the scanning from the right end of the screen to the left end of it is referred to as a blanking period. As an example, a blanking period exists between a pixel data of a pixel p(i, n) of the right end of i-th line and a pixel data of a pixel p(i+1, 1) of the left end of the next line.

In FIGS. 4A to 4C, the image signal, of which respective pixels are composed of plural bits, is sequentially inputted to the input terminal by the pixel. In a time of the first horizontal period, the pixel data of the first line is stored in the DIR2 which has the capacity of the amount of one line. The data of respective pixels of the first line of the image signal which have been stored in the DIR2 are outputted in parallel during the succeeding blanking period, and supplied in parallel to the PEs 3 which have been arranged to the amount of pixels of one line, in such a manner that the data of one pixel is supplied to one PE 3.

In the next one horizontal period, each PE 3 processes the operation with respect to the supplied pixel data of the first line. At the same time, the pixel data of the second line are successively inputted to the DIR 2. In the following blanking period, the processed pixel data of the first line are supplied in parallel from the respective PEs 3 to the DOR 4. At the same time, the pixel data of the second line are supplied in parallel from the DIR 2 to the PEs 3. In the next one horizontal period, the pixel data of the first line which have been stored in the DOR 4 are successively outputted to the output terminal. At the same time, operation of the pixel data of the second line are processed by the PEs 3, and the pixel data of the third line are successively inputted to the DIR 2.

After this, such processes are repeated that at the time the PE 3 processes the pixel data of the i-th line, the DIR 2 takes the pixel data of the (i+1)th line in it, and the DOR 4 outputs the pixel data of the (i−1)th line. The DIR 2, the PE 3, and the DOR 4 operate synchronously as described above, so that the processed image signal is taken out for each horizontal period. In this way, digital processing of the image signal is performed for example.

The DIR 2 and the DOR 4, which are the components of the abovementioned parallel processor 1, are explained more in detail. The DIR 2 is composed of a pointer 5 and a memory 6, as shown in FIG. 5. The pointer 5 has a pointer control signal S1 as the input, and has a pointer output S2 as the output. The pointer control signal S1 is a clock input S11 and a pointer input S12.

The pointer output S2 is connected to the pointer input of the memory 6. The pointer 5 is composed of a shift register circuit. A shift register circuit is a circuit which is widely used when the serial signal and the parallel signal are to be mutually converted. The memory 6 has a serial data input bus 7 and a pointer input as the inputs, and also has a parallel data output bus 8 as the output. The serial data input bus 7 and the parallel data output bus 8 have the sufficient bit width to represent the data of one pixel.

The operation of the DIR 2 will be explained using FIGS. 7A, 7B, 8A, and 8B. The memory 6 of the portion of which pointer output S2 is logic "1" stores the data which has appeared at the serial data input bus 7. If logic "1" is given to the pointer input S12 at only the beginning of the horizontal period and, for example, p(i, 1) to p(i, n) are successively given to the serial data input bus 7 as the pixel data of the i-th line in synchronization with giving of a pulse to the clock input S11, then the pixel data of the amount of one line is stored in the memory 6 of the DIR 2.

The DOR 4 is composed of a pointer 9 and a memory 10 as shown in FIG. 6. The pointer 9 has a pointer control signal S3 as the input and also has a pointer output S4 as the output. The pointer control signal S3 is a clock input S31 and a pointer input S32. The pointer output S4 is connected to the pointer input of the memory 10. The pointer 9 is composed of shift register circuits as with the DIR 2. The memory 10 has a parallel data input bus 11 and a pointer input as the inputs, and also has a serial data output bus 12 as the output. The parallel data input bus 11 and the serial data output bus 12 have the sufficient bit width to represent the data of one pixel.

The operation of the DOR 4 will be explained using FIGS. 9A, 9B, 10A, and 10B. The data which has been stored in the memory 9 of the portion of which pointer output S4 is logic "1" appears at the serial data output bus 12. If logic "1" is given to the pointer input S32 at only the beginning of the horizontal period, and a pulse is given to the clock input S31, then the pixel data appears at the serial data output bus 12 in synchronization with it. If the pulses of an amount of the number of pixels of one line are given to the clock input S31, then for example q(i, 1) to q(i, n) are taken out of the memory 10 of the DOR 4 on the serial data output bus 12 as the pixel data of the i-th line. As to the pointers 5 and 9, the completely identical circuits are used in the DIR 2 and the DOR 4, as will be known from the above description and FIGS. 5 and 6.

By the way, in the case where, for example, n pixels are inputted to the DIR 2 for each line and the operation is processed using n PEs 3 and then n pixels are outputted from the DOR 4 as stated above, the processing can be performed efficiently with the conventional parallel processor 1. However, in the case where such a signal processing is desired that the number of the input pixels for each line and the number of the output pixels for each line are different, such a processing has been difficult to realize with the abovementioned parallel processor 1.

For example, when enlarge processing of the image is to be performed, it is required to process n input pixels per line and to generate (n×r) output pixels per line, where r is a horizontal scale factor (r>1). So, n pixel data to be inputted are stored skippingly in (n×r) memories 6 of the DIR 2 and processed by (n×r) PEs 3, and then (n×r) pixel data are outputted from (n×r) memories 10 of the DOR 4. However, in the abovementioned parallel processor 1, it has been able to merely shift the pointer output S2 by one at the time one pulse of the clock input S11 has been given, because a conventional shift register circuit has been utilized as the pointer 5 of the DIR 2.

Accordingly, to store one pixel data in, for example, two memories 6 of the DIR 2, it has been required to give the clock input S11 to the pointer input S12 of the DIR 2 at twice the speed of transmission of the image data which is supplied to the serial data input 7 of the DIR 2. However, because of, for example, high speed of the transfer of the video signal, it has been extremely difficult to generate the clock input S11 of the pointer 5 at several times the speed of the video signal. By such a reason, enlargement processing of the image has been difficult.

Besides, in the case where, for example, reducing processing of the image is to be performed, it is required to process n input pixels per line and to generate (n×s) output pixels per line, where s is a horizontal scale factor (s<1). So, n pixel data to be inputted are stored in n memories 6 of the DIR 2 and processed by n PEs 3, and then only (n×s) pixel data needed are outputted skippingly from n memories 10 of the DOR 4. However, in the abovementioned parallel processor 1, it has been able to merely shift the pointer output S4 by one when one pulse of the clock input S31 has been given, because a conventional shift register circuit has been utilized as the pointer 9 of the DOR 4.

Accordingly, for instance, to take one pixel data out of two memories 10 of the DOR 4 and skip reading of one pixel data, it has been required to give the clock input S31 to the pointer input S32 of the DOR 4 at twice the speed of transmission of the image data which is supplied to the serial data output 12 of the DOR 4. However, because of, for example, high speed of the transfer of the video signal, it has been extremely difficult to generate the clock input S31 of the pointer 9 at several times the speed of the video signal. By such a reason, reducing processing of the image has been also difficult.

As described above, a usual shift register circuit has been utilized in the pointer 5 of the DIR 2 in the conventional parallel processor, so it has been difficult to realize storing of the pixel data into the DIR 2 skippingly, because extremely high speed clock signals have been needed. Besides, a usual shift register circuit has been utilized in the pointer 9 of the DOR 4 too, so it has been difficult to realize taking of the pixel data out of the DOR 4 skippingly, because extremely high speed clock signals have been needed.

SUMMARY OF THE INVENTION

In view of the foregoing, an object of this invention is to provide a parallel processor device which is able to process the data in an arbitrary skipping manner and then output it without the necessity of high speed clock signal when the serial data is converted to the parallel data by the specified unit and processed in parallel and then outputted as the serial data.

The foregoing object and other objects of this invention have been achieved by the provision of a parallel processor device 1 for inputting the plural first data which are composed of serial data to a data input register 30 of serial-in parallel-out type, supplying in parallel the parallel output 8 of the data input register 30 to plural processor elements 3, processing the operation of the first data with the processor elements 3, inputting in parallel the plural second data which are outputted in parallel from the processor elements 3 as the result of the operation to a data output register 31 of parallel-in serial-out type, and outputting the second data from the serial output 12 of the data output register 31 as a serial data; wherein the first pointer mode control means 21 for controlling the address of data writing into the data input register 30 is provided, and the number and the interval of the first data is controlled when the first data is inputted to the data input register 30.

Besides, this invention provides a parallel processor device 1 for inputting the plural first data which are composed of serial data to a data input register 30 of serial-in parallel-out type, supplying in parallel the parallel output 8 of the data input register 30 to plural processor elements 3, processing the operation of the first data with the processor elements 3, inputting in parallel the plural second data which are outputted in parallel from the processor elements 3 as the result of the operation to a data output register 31 of parallel-in serial-out type, and outputting the second data from the serial output 12 of the data output register 31 as a serial data; wherein the second pointer mode control means 21 for controlling the address of data reading from the data output register 31 is provided, and the interval of the second data is controlled when the second data is outputted from the data output register 31.

Further, this invention provides a parallel processor device 1 for inputting the plural first data which are composed of of serial data to a data input register 30 of serial-in parallel-out type, supplying in parallel the parallel output 8 of the data input register 30 to plural processor elements 3, processing the operation of the first data with the processor elements 3, inputting in parallel the plural second data which are outputted in parallel from the processor elements 3 as the result of the operation to a data output register 31 of parallel-in serial-out type, and outputting the second data from the serial output 12 of the data output register 31 as a serial data: wherein the first pointer mode control means 21 for controlling the address of data writing to the data input register 30, and the second pointer mode control means 21 for controlling the address of data reading from the data output register 31 are provided; and the number and the interval of the first data is controlled when the first data is inputted to the data input register 30, and also the interval of the second data is controlled when the second data is outputted from the data output register 31.

The first pointer mode control means 21 for controlling the address of data writing into the data input register 30 is provided, and the number and the interval of the first data are controlled when the first data is inputted to the data input register 30, as a result, although it has been able to merely shift the pointer output one by one heretofore, shifting with arbitrary number and interval becomes possible, thus it is able to store the data in the data input register 30 in a skipping manner without the necessity of the high speed clock.

Besides, the second pointer mode control means 21 for controlling the address of data reading from the data output register 31 is provided, and the interval of the second data is controlled when the second data is outputted from the data output register 31, as a result, although it has been able to merely shift the pointer output one by one heretofore, shifting with arbitrary interval becomes possible, thus it is able to take the data out of the data output register 31 in a skipping manner without the necessity of the high speed clock.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 8A and 8B are block diagrams explaining the operation of the DIR in the conventional parallel processor;

FIGS. 10A and 10B are block diagrams explaining the operation of the DOR in the conventional parallel processor;

DETAILED DESCRIPTION OF THE EMBODIMENT

Figures 1, 2:
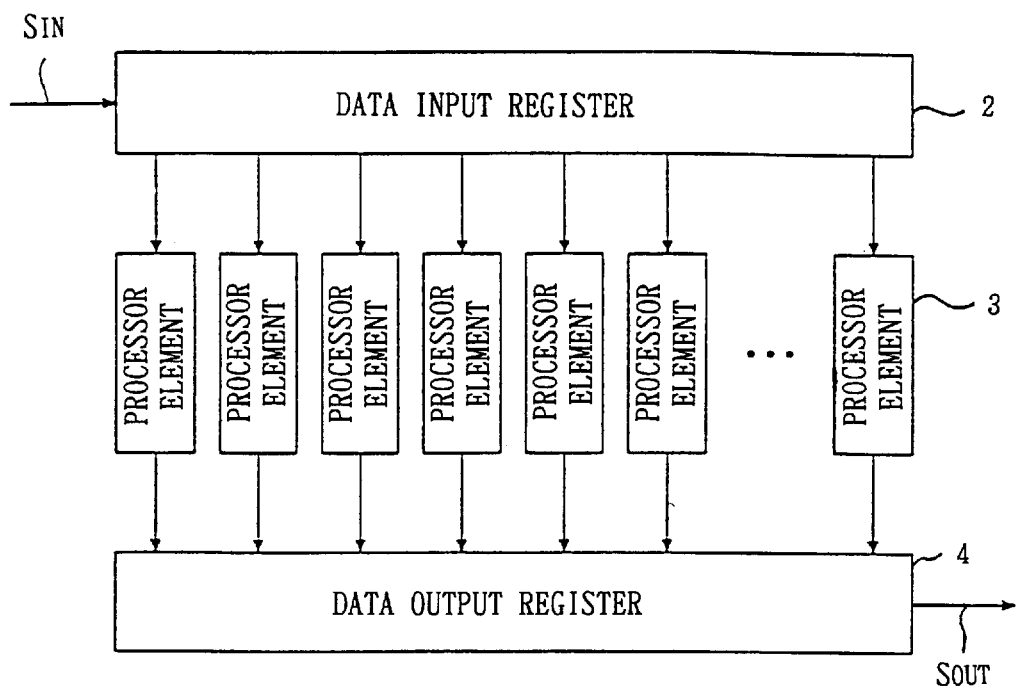
FIG. 1 is a block diagram showing the general construction of the parallel processor.
FIG. 2 is a schematic diagram explaining the correspondence of the image data to the pixel data.
Figure 3:
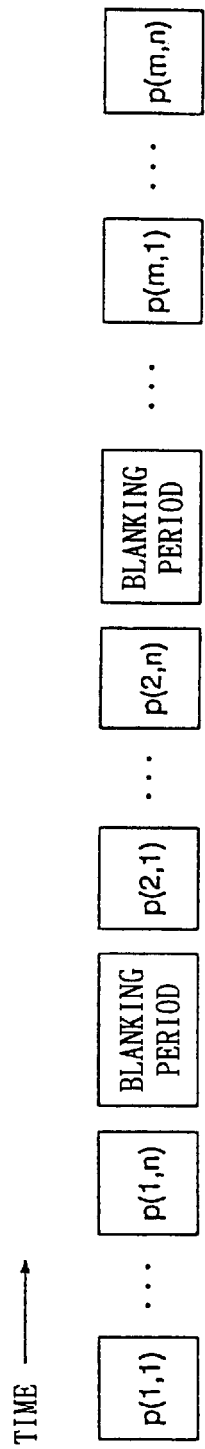
FIG. 3 is a schematic diagram explaining the transmission format of the image data.
Figure 4:
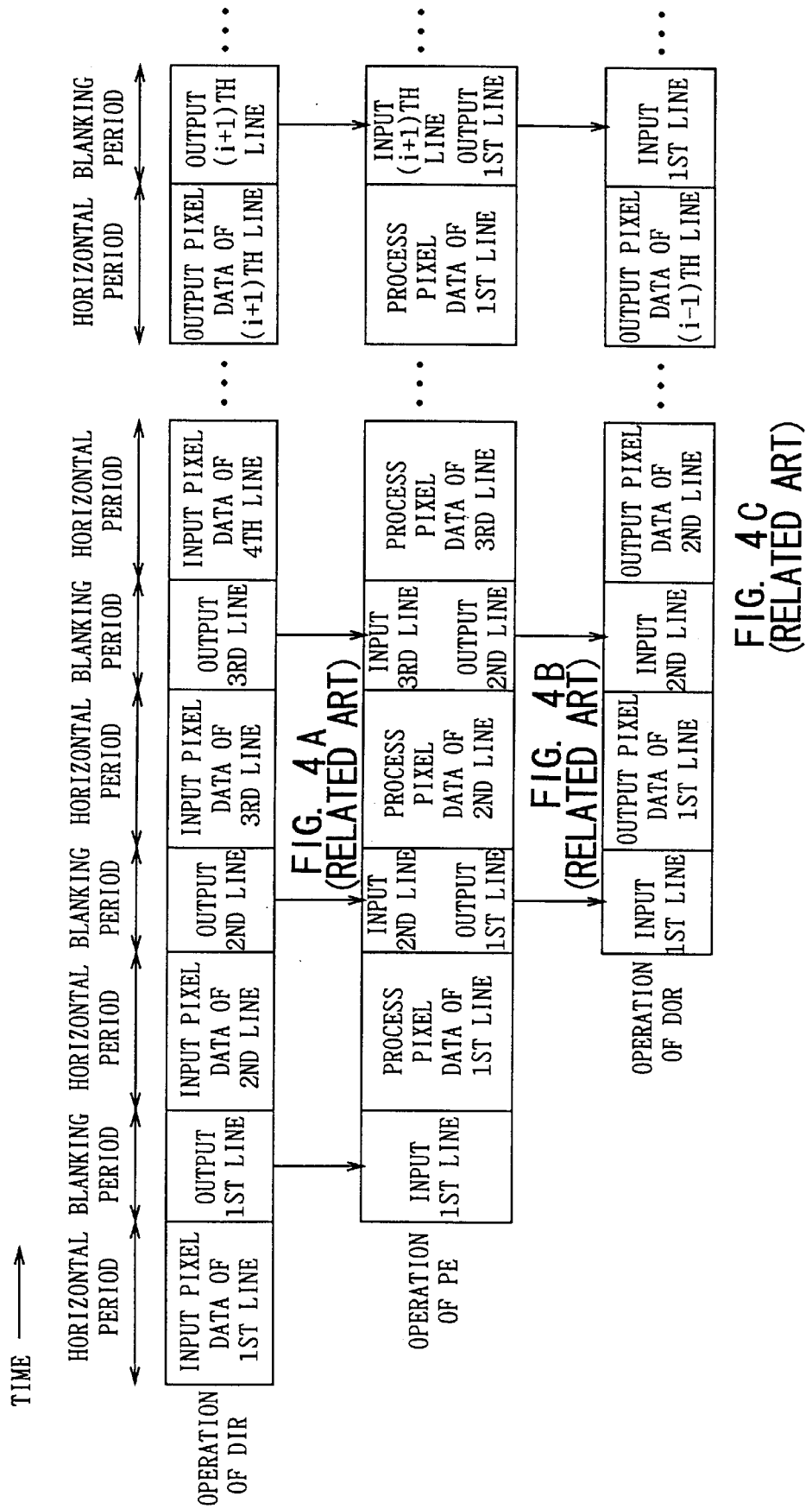
FIGS. 4A to 4C are schematic diagrams showing the procedure of processing of the image data by the parallel processor of FIG. 2.
Figure 5:
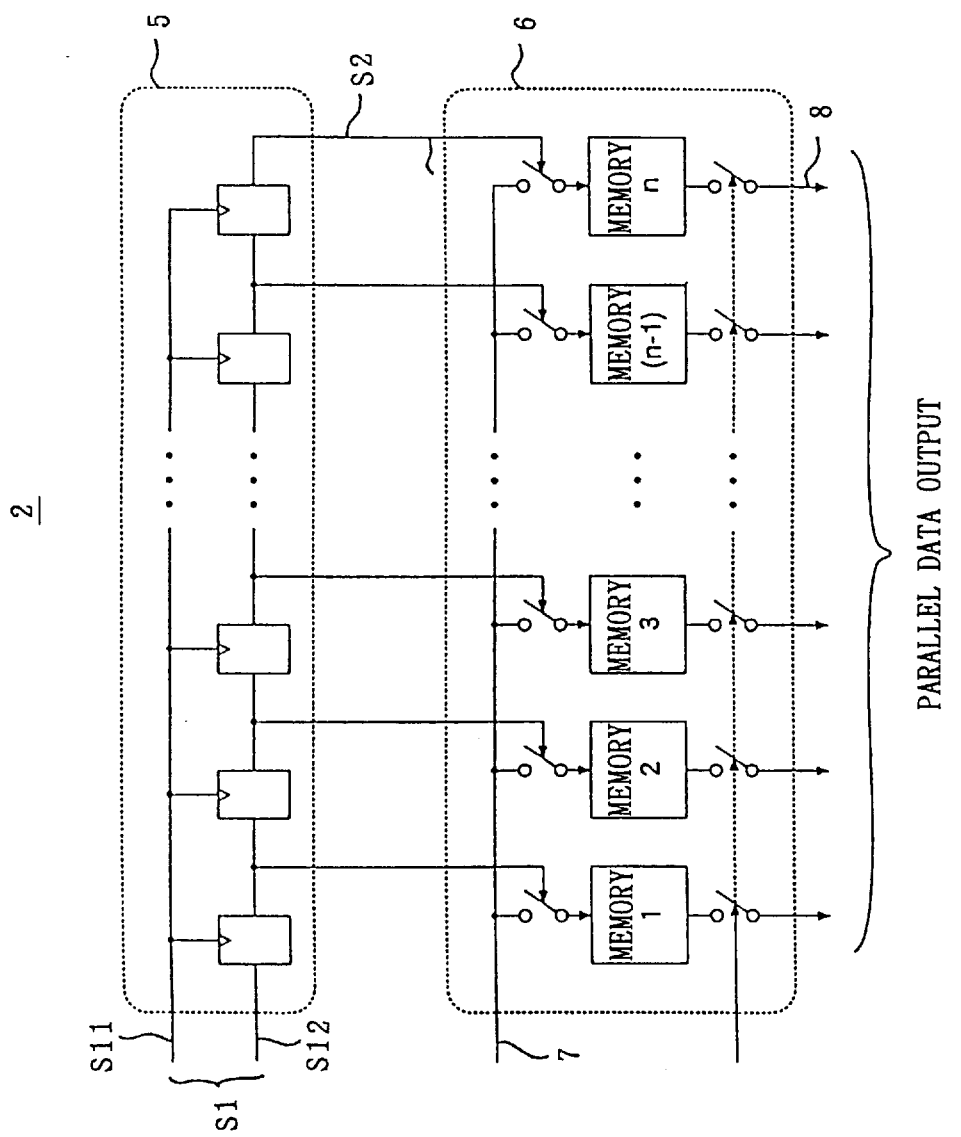
FIG. 5 is a block diagram showing the construction of the DIR in the conventional parallel processor.
Figure 6:
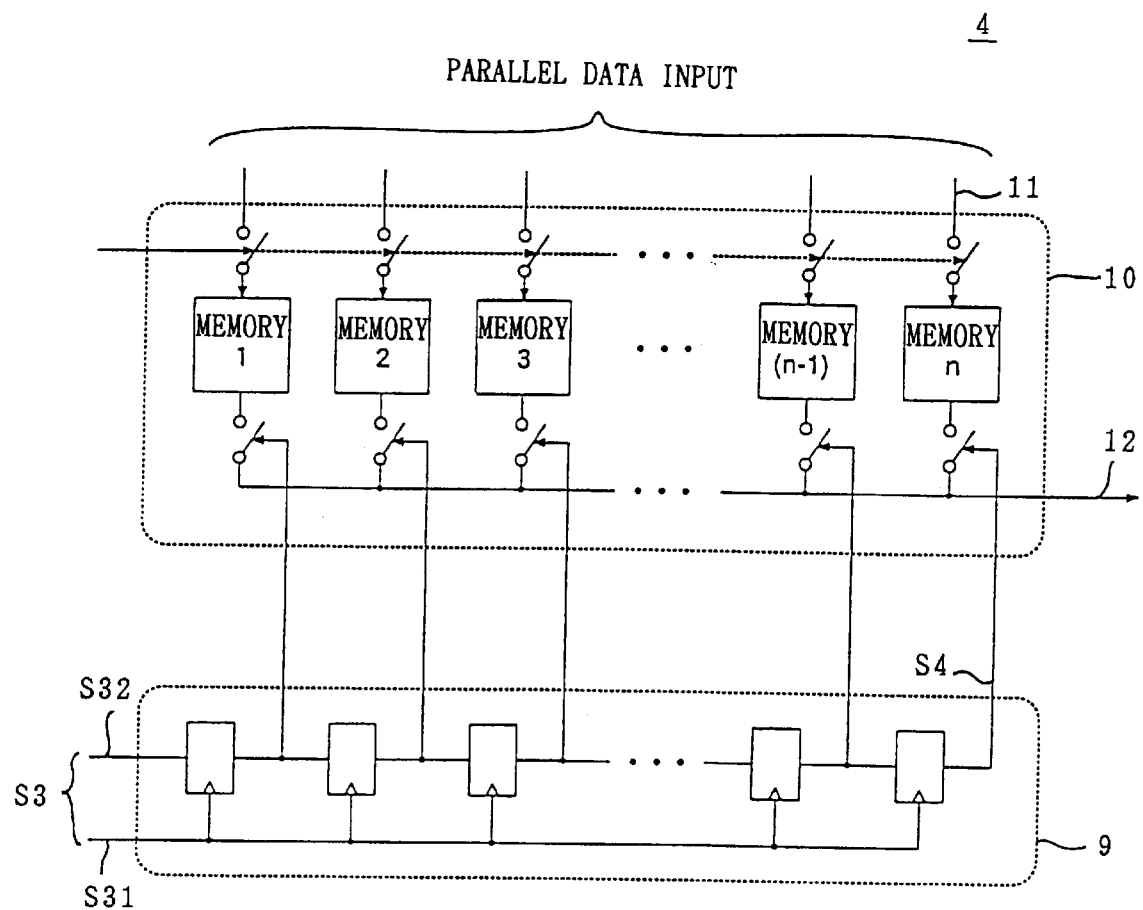
FIG. 6 is a block diagram showing the construction of the DOR in the conventional parallel processor.
Figure 7A:
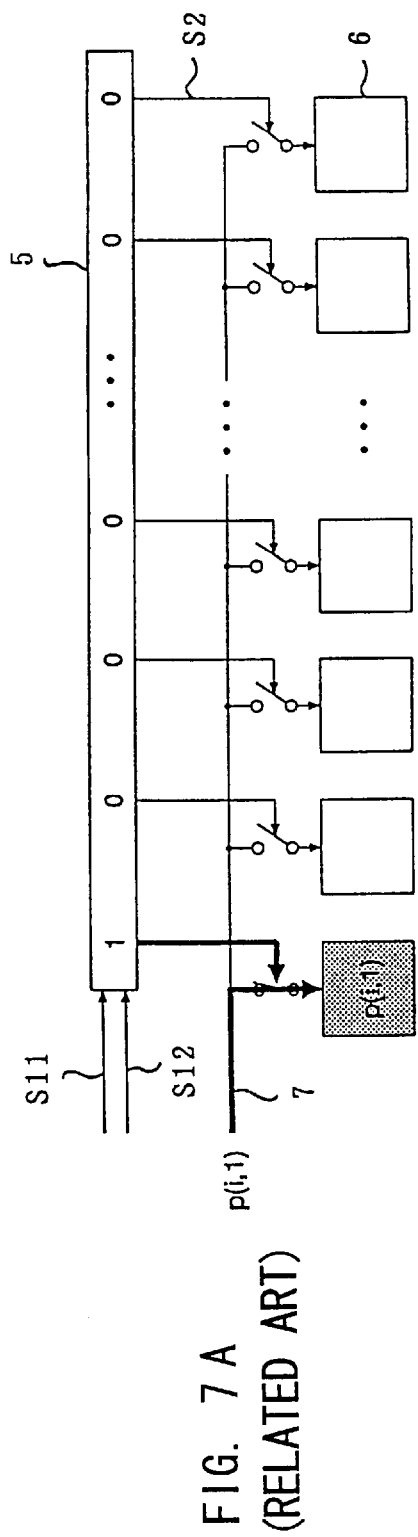
FIGS. 7A and 7B are block diagrams explaining the operation of the DIR in the conventional parallel processor.
Figure 7B:
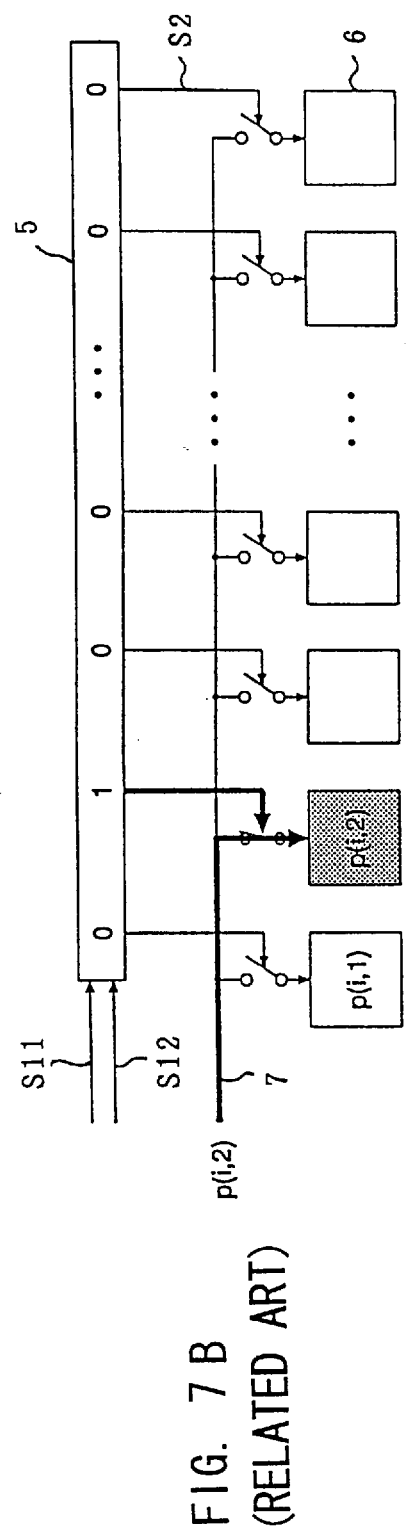
Figures 9A, 9B:
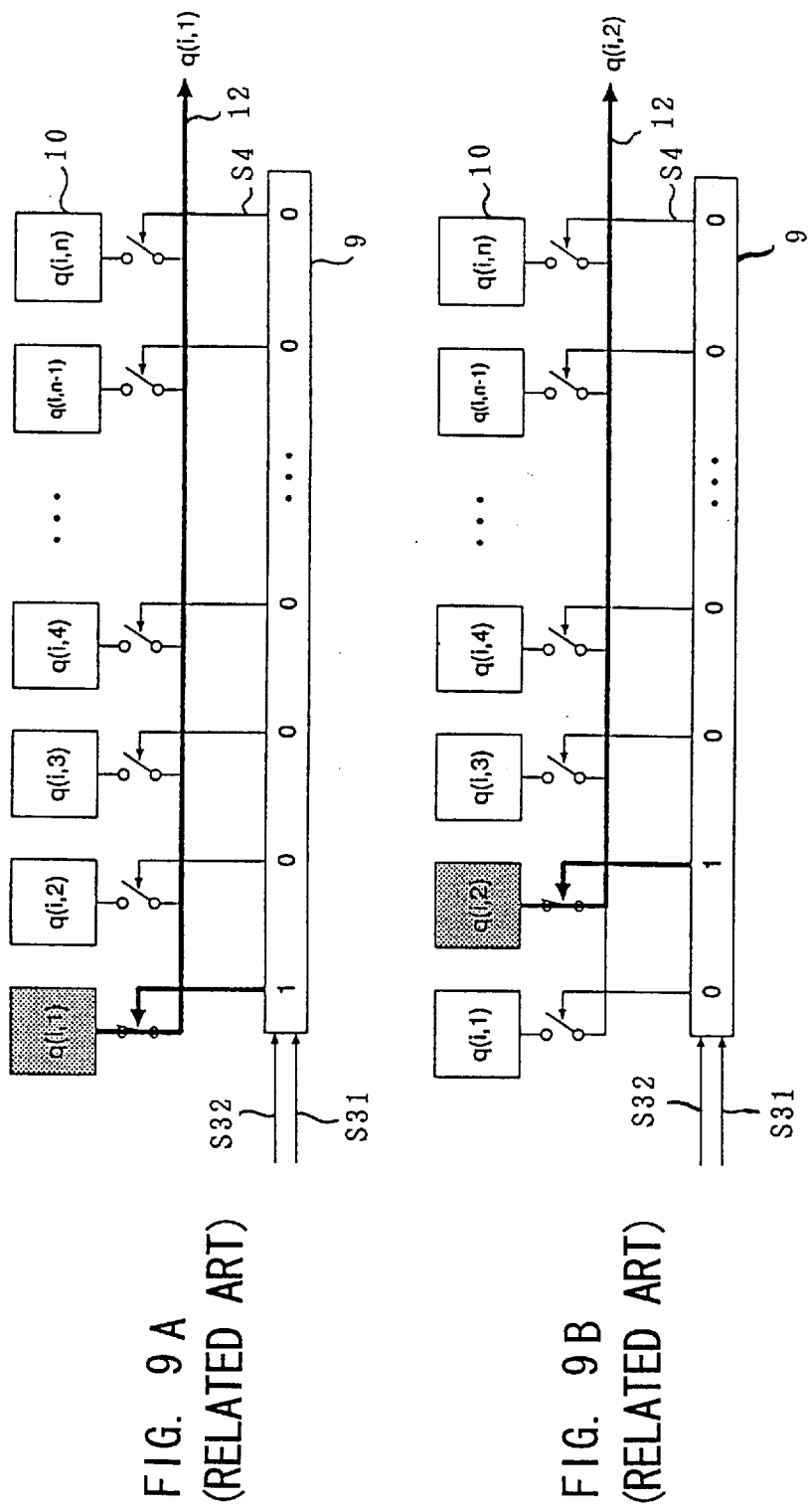
FIGS. 9A and 9B are block diagrams explaining the operation of the DOR in the conventional parallel processor.
Figure 11:
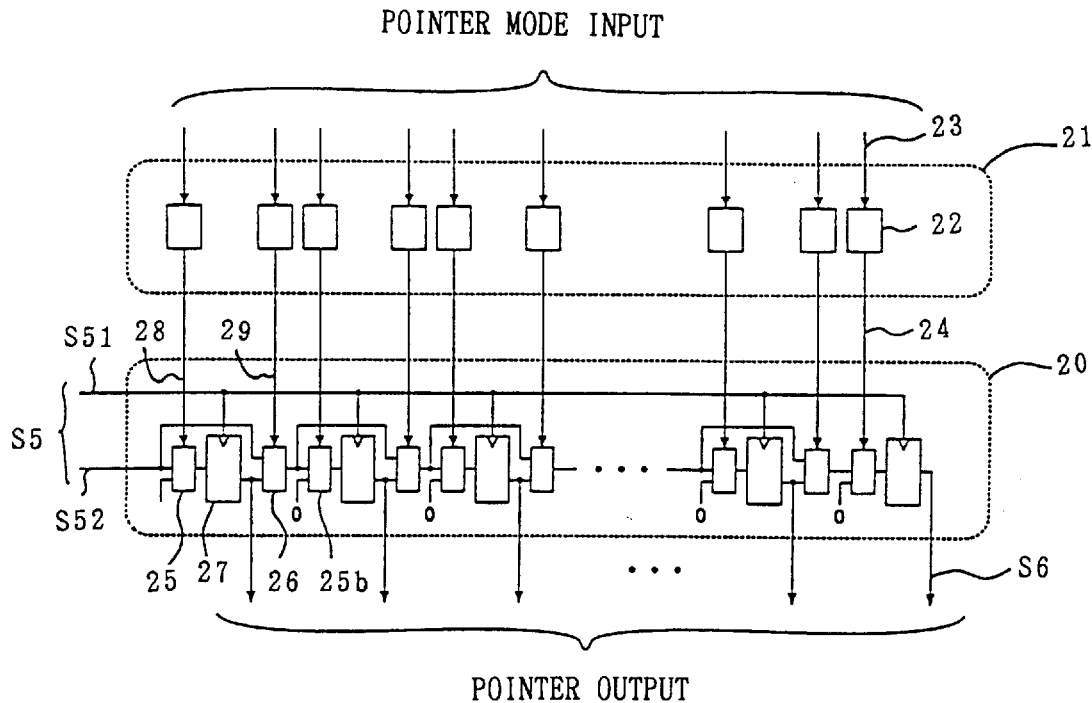
FIG. 11 is a block diagram showing the construction of the pointer which is utilized for the DIR and the DOR of the parallel processor according to an embodiment of this invention.

Preferred embodiments of this invention will be described with reference to the accompanying drawings:

In FIG. 11, the reference numeral 20 shows a pointer according to an embodiment of this invention, which can be substituted for the conventional pointers 5 and 9, and may be utilized as a pointer of the DIR 2 or a pointer of the DOR 4. For the same purpose as the conventional pointers 5 and 9, it has a pointer control signal S5, namely a clock input S51 and a pointer input S52, and plural pointer outputs S6. The reference numeral 21 shows a pointer mode control circuit for controlling a mode of the pointer 20.

In the case of this embodiment, the pointer mode control circuit 21 is actualized with plural one-bit memories 22, and having inputs 23 for data writing to these one-bit memories 22. In order to write arbitrary data, another circuit is connected to the data writing input 23. For example, a part of the output of the PE 3 may be connected, or an output of a ROM or a RAM in which the data has been previously registered may be connected. An output 24 of the pointer mode control circuit 21 is connected to the first selector 25 or the second selector 26 which are contained in the pointer 20.

The reference numeral 27 denotes one of plural unit delay elements which constitute the pointer 20. The reference numeral 25 denotes the first selector which selects an input of the unit delay element 27, and the first select input 28 of the first selector 25 receives the output 24 of the pointer mode control circuit 21. In the case where the first select input 28 is logic "0", the first selector 25 selects the signal which is transferred from the preceding stage and connects it to the unit delay element 27. In the case where the first select input 28 is logic "1", the first selector 25 selects the signal of which logic is "0" and connects it to the unit delay element 27.

The reference numeral 26 denotes the second selector which selects an output to the succeeding stage of the unit delay element 27, and the second select input 29 of the second selector 26 receives the output 24 of the pointer mode control circuit 21. In the case where the second select input 29 is logic "0", the second selector 26 selects the signal which is transferred from the preceding stage and connects it to the first selector 25b of the succeeding stage. In the case where the second select input 29 is logic "1", the second selector 26 selects the output signal of the unit delay element 27 and connects it to the first selector 25b of the succeeding stage.

Figure 12A:
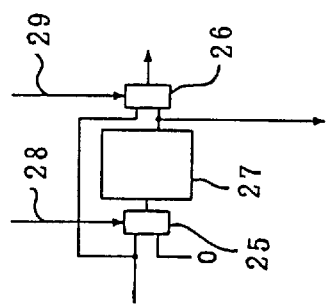
FIGS. 12a to 12E are block diagrams explaining the operating principle of the pointer of FIG. 11.
Figure 12B:
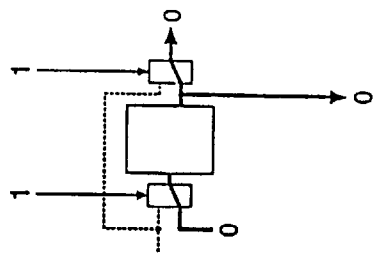
Figure 12C:
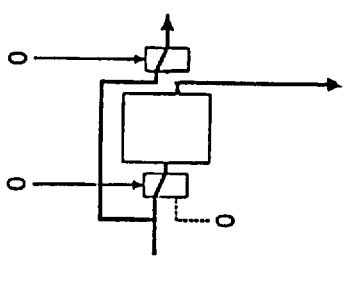

On the above construction, the unit delay element 27 operates in accordance with the principle shown in FIGS. 12A to 12E. FIG. 12A shows one of the unit delay elements 27 as well as respective ones of the first selectors 25 and the second selectors 26 which are placed on the input side and the output side of the unit delay element 27 respectively. Hereupon, four modes shown in FIGS. 12B to 12E are possible, depending on the combination of the first select input 28 and the second select input 29. In the mode shown in FIG. 12B, the unit delay element 27 acts as a unit delay element which composes a general shift register circuit. Accordingly, if all of the unit delay elements 27 are set to the mode shown in FIG. 12B, then they operate equally to the conventional pointers 5 and 9. In the mode shown in FIG. 12C, the unit delay element 27 is cut away from the shift register, and the pointer signal which is inputted from the preceding stage is passed to the succeeding stage, skipping the unit delay element 27. Therefore, by setting the arbitrary number of unit delay elements 27 to the mode of FIG. 12C, it is able to compose the shift register circuit which is adapted to shift the pointer signal in a skipping manner with arbitrary interval.

Figure 12D:
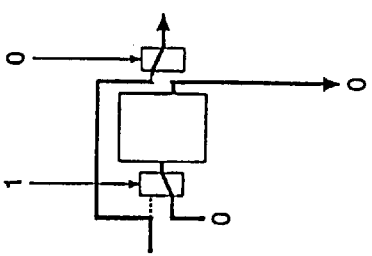
Figure 12E:
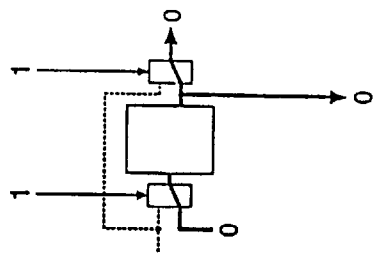

Besides, in the mode of FIG. 12D, the pointer signal from the preceding stage is received by the unit delay element 27, and also the pointer signal from the preceding stage is caused to skip the unit delay element 27 and passed to the succeeding stage. Therefore, by setting the arbitrary number of unit delay elements 27 to the mode of FIG. 12D, it is able to compose the shift register circuit which is adapted to shift the pointer signal with a width of arbitrary number. Further, in the mode of FIG. 12E, the unit delay element 27 acts to terminate the transmission of the pointer signal to the succeeding stage. This means that the pointer signal is not transmitted to the succeeding stages further than the unit delay element 27 of which mode is mode shown in FIG. 12E, and as a result, there is such an effect that the power consumption of the circuits of the succeeding stages is suppressed to lower.

Figure 13A:
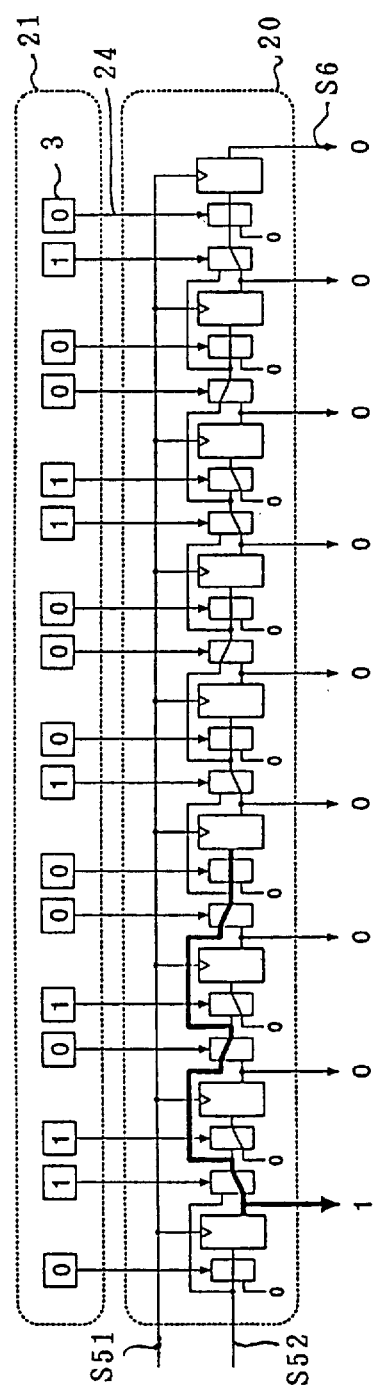
FIGS. 13A and 13B are block diagrams explaining the operation of the pointer of FIG. 11.
Figure 13B:
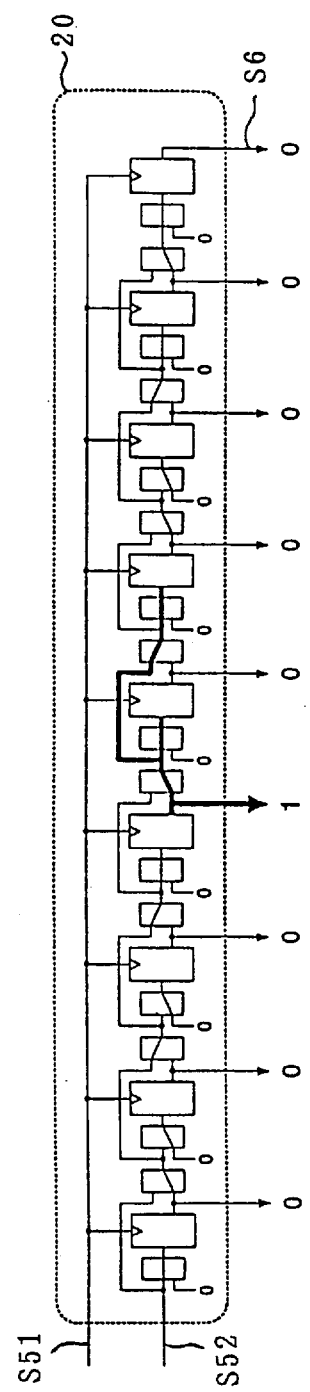
Figure 14A:
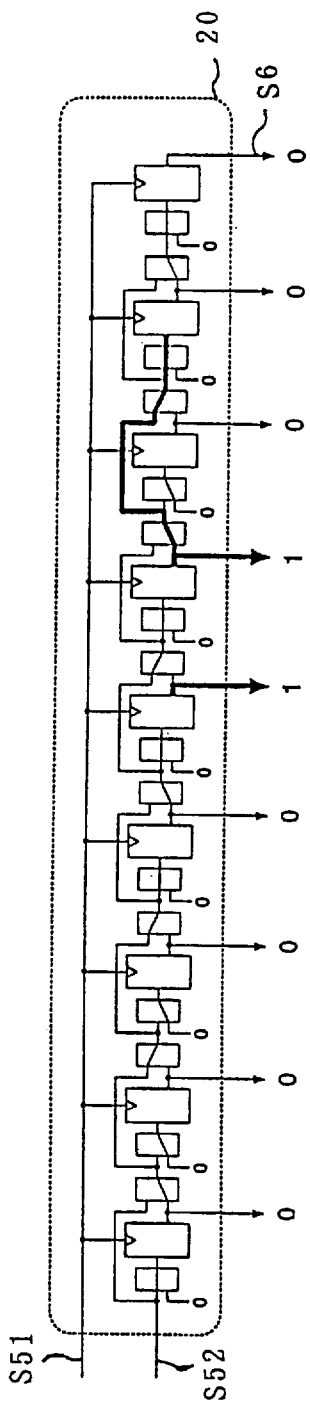
FIGS. 14A to 14C are block diagrams explaining the operation of the pointer of FIG. 11.
Figure 14B:
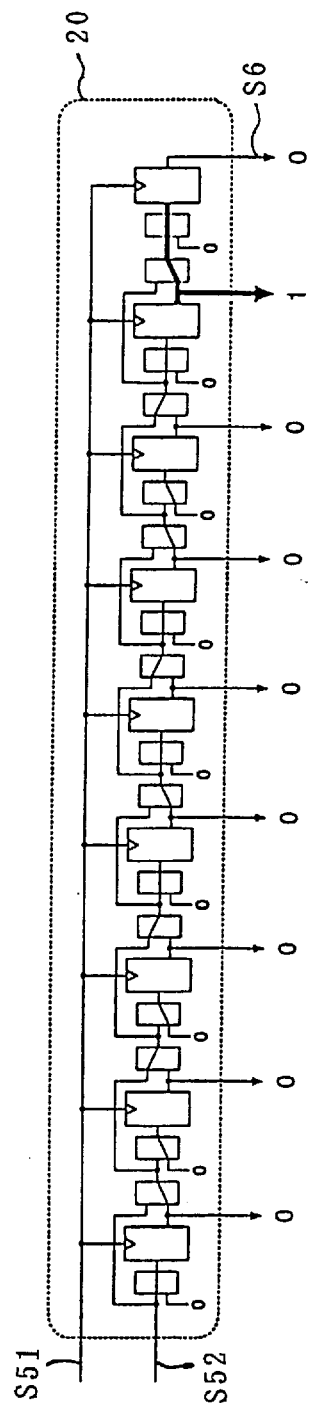
Figure 14C:
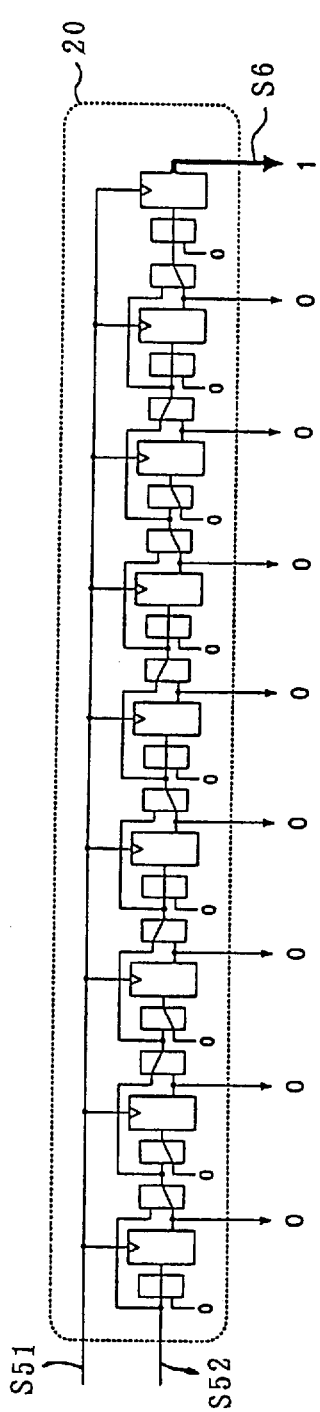

Here, in order to set the respective unit delay elements 27 to the desired modes, the patterns of the first select input 28 and the second select input 29 are prepared and stored in the memory 22 of the pointer mode control circuit 21, whereby it is able to constitute a pointer which is adapted to shift the pointer output with arbitrary interval or arbitrary number. For example, if the pointer mode control circuit 21 is set like FIG. 13A and one pulse input is given to the pointer input S52, the pointer output S6 is successively shifted as shown in FIGS. 13B and 14A to 14C each time a clock signal is given to the clock input S51 thereafter.

Figure 15:
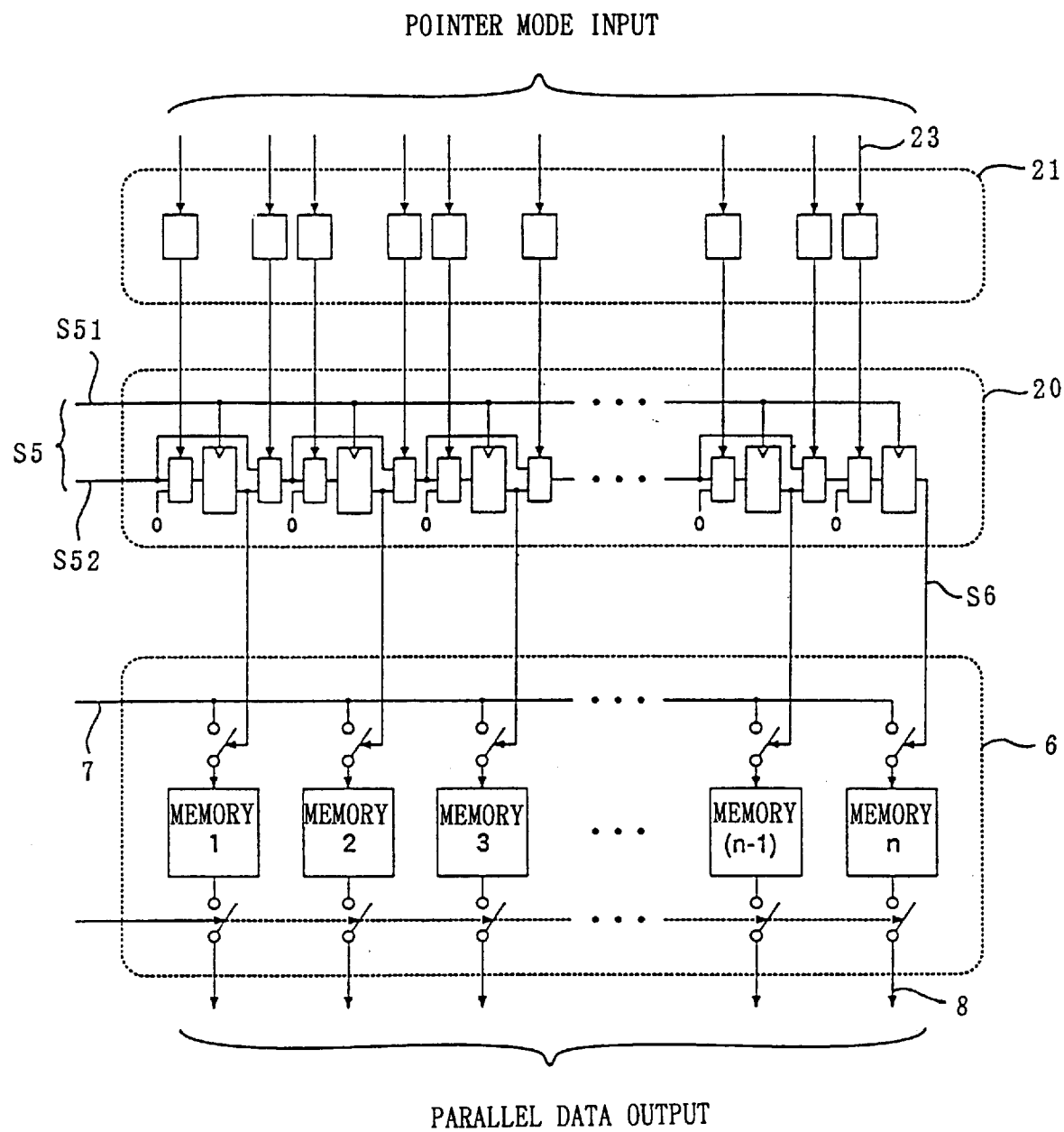
FIG. 15 is a block diagram showing the DIR of the parallel processor which is utilizing the pointer of FIG. 11.
Figure 16A:
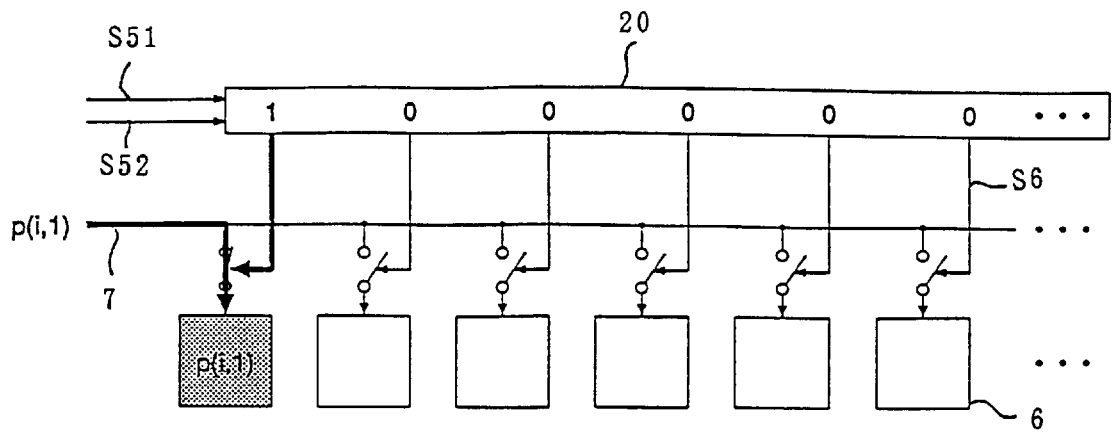
FIGS. 16A to 16C are block diagrams explaining the operation of the DIR of FIG. 15.
Figure 16B:
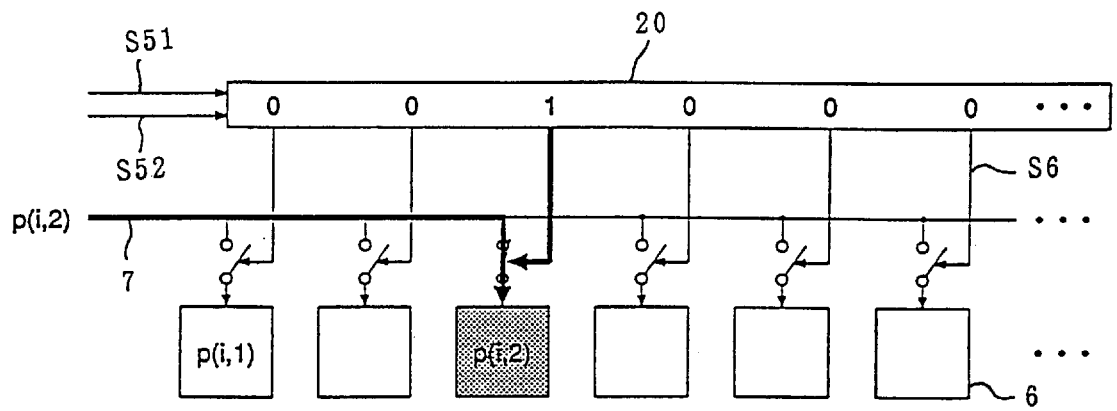
Figure 16C:
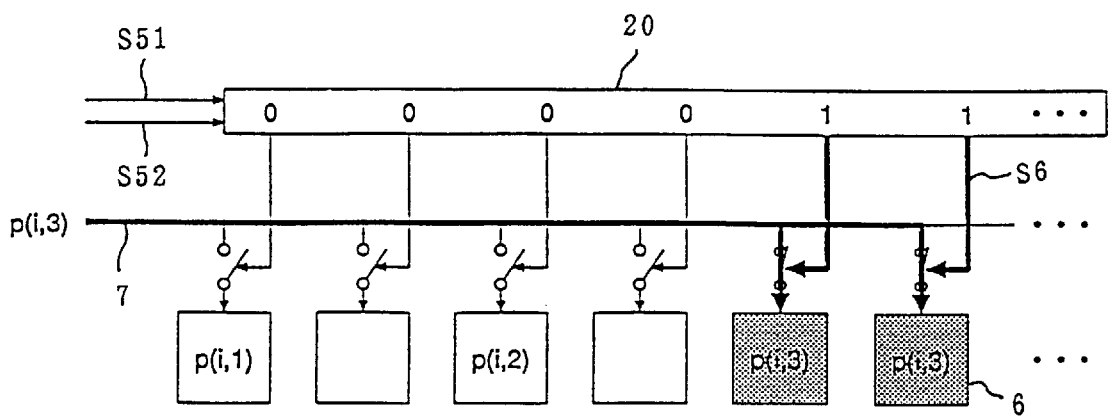

The pointer of the DIR 30 which has been constituted utilizing the abovementioned pointer mode control circuit 21 is shown in FIG. 15, and its operation is shown in FIGS. 16A to 16C. By merely giving the pattern for realizing the desired magnification ratio to the pointer mode input 23 and giving the signals to the clock input S51, the pointer input S52, and the serial data input 7 at the same timings as usual, it can be stored in the memory 6 of the DIR 30 with the desired interval and number. Therefore, if this DIR 30 is utilized in the parallel processor 1, for example an image enlarge processing having arbitrary scale factor can be performed with the same input/output speed as usual.

Figure 17:
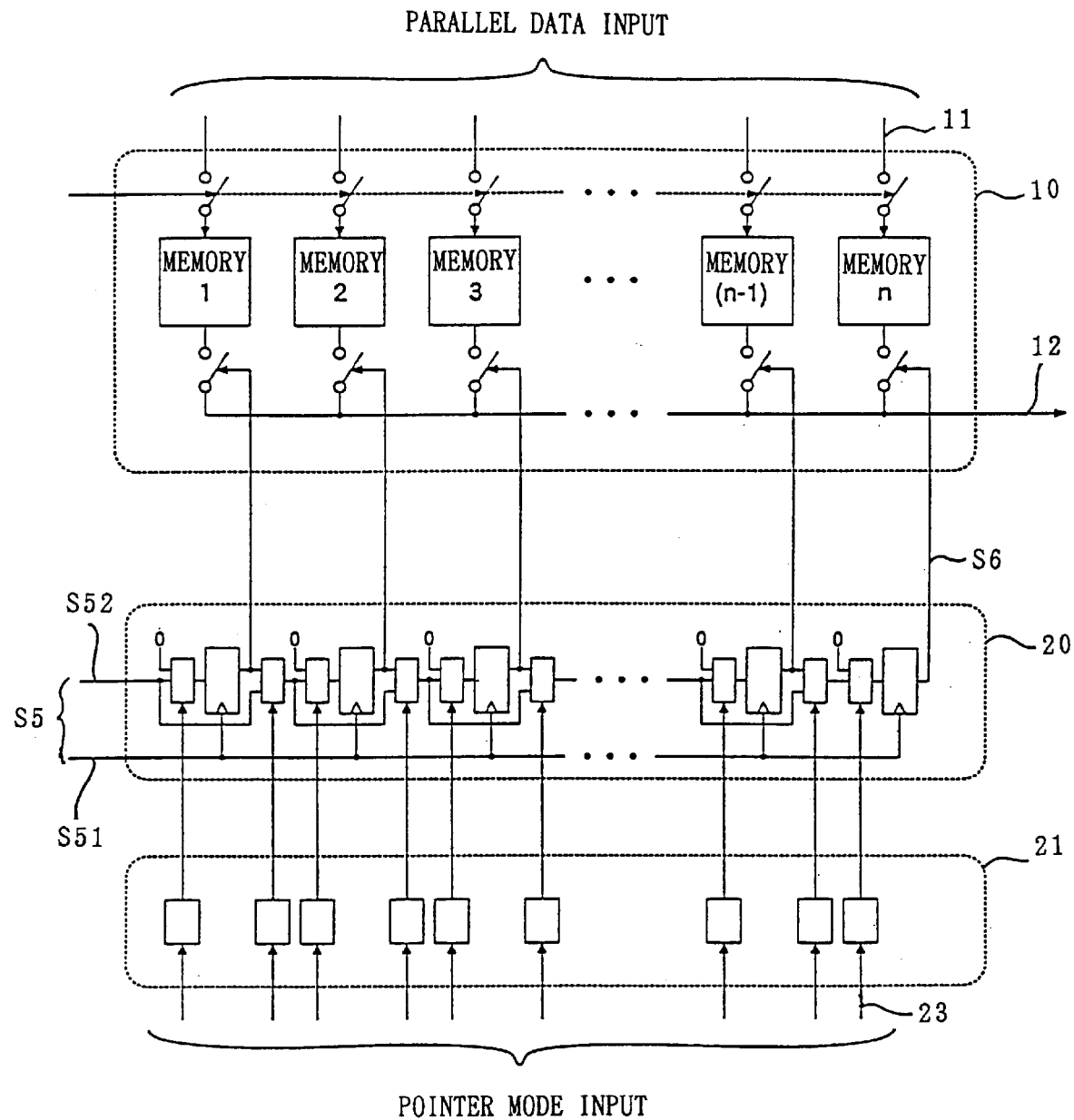
FIG. 17 is a block diagram showing the DOR of the parallel processor which is utilizing the pointer of FIG. 11.
Figure 18:
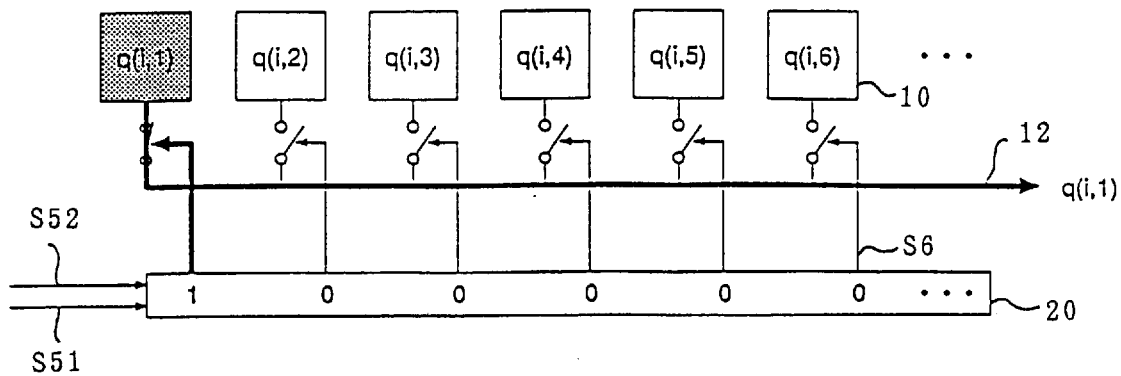
FIGS. 18A to 18C are block diagrams explaining the operation of the DOR of FIG. 17.
Figure 18:
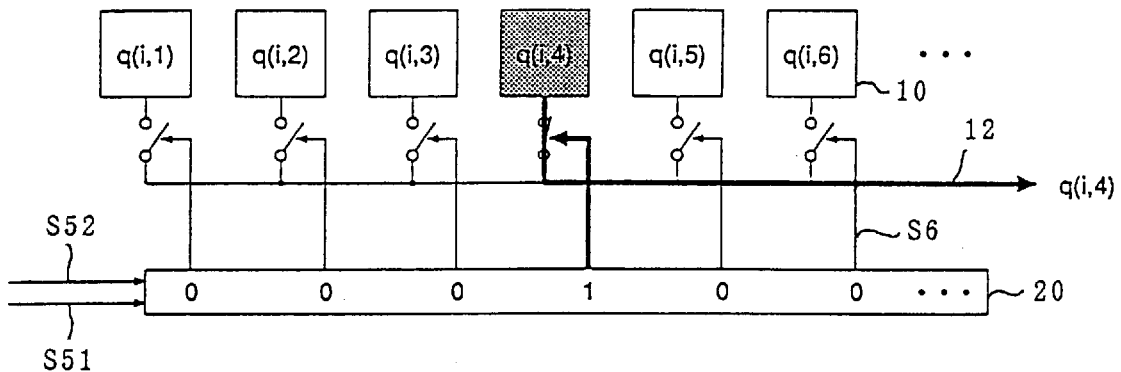
Figure 18:
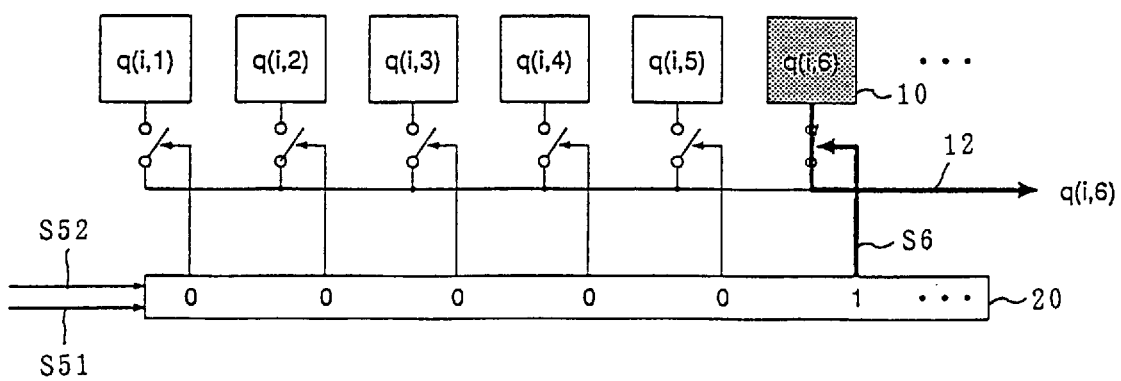

The pointer of the DOR 31 which has been constituted utilizing the abovementioned pointer mode control circuit 21 is shown in FIG. 17, and its operation is shown in FIGS. 18A to 18C. By merely setting the pattern for realizing the desired reducing ratio to the pointer mode input 23 and giving the signals to the clock input S51 and the pointer input S52 at the same timing as usual, the data can be taken out of the memory 10 of the DOR 31 onto the serial data output 12, in such a manner that the unnecessary results of the operation are skipped, as shown in FIGS. 18A to 18C. Accordingly, if this DOR 31 is utilized in the parallel processor 1, for example an image reducing processing with arbitrary scale factor can be performed with the same input/output speed as usual. In the case where the circuit shown in FIG. 17 is used as the DOR 31, utilizing the mode shown in FIG. 12D brings conflict of the output data, hence it is not generally recommended.

According to the above construction, owing to the fact that the DIR 30 of FIG. 15 is utilized in this way and the DOR 31 of FIG. 17 is also utilized, by merely inputting/outputting the data at the same timing as the foregoing, the parallel processor 1 which is able to perform, for example, image enlarge/reducing processing with arbitrary scale factor can be realized.

Figure 19:
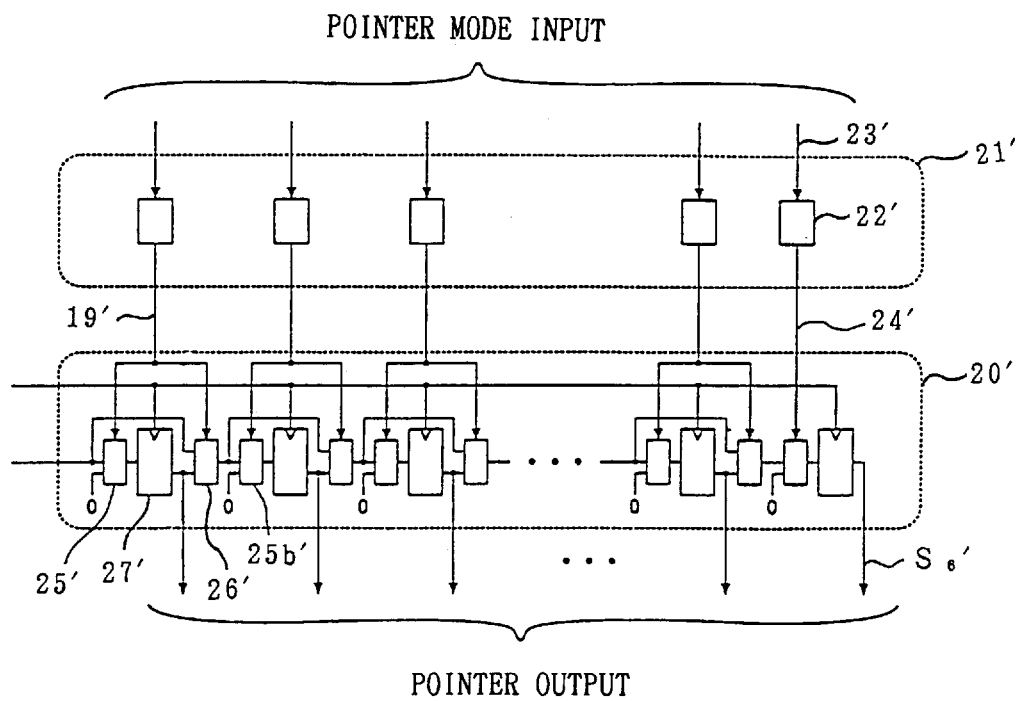
FIG. 19 is a block diagram showing the construction of the pointer which is utilized for the DIR and the DOR of the parallel processor according to the other embodiment of this invention.

In addition, the other embodiment of this invention is shown in FIG. 19. The unit delay elements 27', which constitute the pointer, of the embodiment of FIG. 19 utilize only two kinds of mode shown in FIGS. 12B and 12C. Because selection of mode out of two kinds can be performed by one bit, the capacity of the memory 22' which is needed to construct the pointer mode control circuit 21' can be reduced to half as compared with the constitution of FIG. 11. In this construction, the selector 26' corresponds to the second selector 26 in the construction of FIG. 11, but its operating logic is inverse. This means that the output signal of the unit delay element 27' is selected and connected to the selector 25b' of the succeeding stage, in the case where the select input 19' is logic "0". On the other hand, in the case where the select input 19' is logic "1", the signal which is transferred from the preceding stage is selected and connected to the selector 25b' of the succeeding stage. However, the difference between the selector 26 and the selector 26' is merely related to representation of the circuit diagram, and is not important in the actual circuit layout.

In this manner, the reason why the selector 26 and the selector 26' are inverse is to adapt to that the selector 26 and the selector 26' can operate by the same logic ("0" or "1") with respect to the select input 19'.

In the abovementioned embodiment, the general memory circuit has been utilized in the pointer mode control circuit. However, the circuit having such a function that a status can be rewritten and held like a shift register circuit etc. can be similarly utilized in the pointer mode control circuit.

As stated above, according to this invention, the first pointer mode control means for controlling the address of data writing into the data input register is provided, and the number and the interval of the first data are controlled when the first data is inputted to the data input register, as a result, although it has been able to merely shift the pointer output one by one heretofore, shifting with arbitrary number and arbitrary interval becomes possible, thus it is able to realize the parallel processor device which can store the data in the data input register in a skipping manner without the necessity of the high speed clock.

Besides, according to this invention, the second pointer mode control means for controlling the address of data reading from the data output register is provided, and the interval of the second data is controlled when the second data is outputted from the data output register, as a result, although it has been able to merely shift the pointer output one by one heretofore, shifting with arbitrary interval becomes possible, thus it is able to realize the parallel processor device which can take the data out of the data output register in a skipping manner without the necessity of the high speed clock.

While the invention has been described in connection with its preferred embodiments, it will be obvious to those skilled in the art that various changes and modifications may be aimed, therefore, to cover in the appended claims all such changes and modifications as fall within the true spirit and scope of the invention.

What is claimed is:

1. A parallel processor for digital processing video signals, said processor comprising:

a data input register for receiving plural first data which consists of serial data and outputting it as parallel data said data input register comprising a first pointer connected to a first memory;

a processor element for processing a specified operation to said first data being said parallel data and outputting it as operated plural second data;

a data output register to be supplied with said plural second data in parallel, for outputting said plural second data being said parallel data as serial data, said data output register comprising a second pointer connected to a second memory; and first pointer mode control means connected to said first pointer for controlling an address of data writing into said data input register, to thereby selectively change number of said first data and the interval therebetween when said first data is inputted to said data input register, whereby an image size can be selectively changed.

2. The parallel processor according to claim 1, wherein:

said first pointer is formed by connecting plural unit delay elements in series, and arranging a first selector and a second selector on an input side and on an output side of each of said unit delay elements, respectively, said first selector selecting and inputting the input data or the specified data into respective unit delay element, said second selector selecting said input data or output data and outputting it to a succeeding stage; and the states of selection of said plural first and second selectors are controlled respectively by said first pointer mode control means, to thus make it possible to shift said video signals through said first pointer in a selectively skipping manner.

3. A parallel processor for digital processing video signals, said processor comprising:

a data input register for receiving plural first data which consists of serial data and outputting it as parallel data, said data input register comprising a first pointer connected to a first memory;

a processor element for processing a specified operation to said first data being said parallel data and outputting it as operated plural second data;

a data output register to be supplied with said plural second data in parallel, for outputting said plural second data being said parallel data as serial data, said data output register comprising a second pointer connected to a second memory; and second pointer mode control means connected to said second pointer for controlling an address of data reading from said data output register, to thereby selectively change the interval between said second data when said second data is outputted from said data output register, whereby an image size can be selectively changed.

4. The parallel processor according to claim 3, wherein:

said second pointer is formed by connecting plural unit delay elements in series, and arranging a first selector and a second selector on an input side and on an output side of each of said unit delay elements, respectively, said first selector selecting and inputting the input data or the specified data into respective unit delay element, said second selector selecting said input data or output data and outputting it to a succeeding stage; and the states of selection of said plural first and second selectors are controlled respectively by said second pointer mode control means, to thus make it possible to shift said video signals through said second pointer in a selectively skipping manner.

5. A parallel processor for digital processing video signals, said processor comprising:

a data input register for receiving plural first data which consists of serial data and outputting it as parallel data, said data input register comprising a first pointer connected to a first memory;

a processor element for processing a specified operation to said first data being said parallel data and outputting it as operated plural second data;

a data output register to be supplied with said plural second data in parallel, for outputting said plural second data being said parallel data as serial data, said data output register comprising a second pointer connected to a second memory;

first pointer mode control means connected to said first pointer for controlling an address of data writing into said data input register, to thereby selectively change number of said first data and the interval therebetween when said first data is inputted to said data input register; and second pointer mode control means connected to said second pointer for controlling an address of data reading from said data output register, to thereby selectively change the interval between said second data when said second data is outputted from said data output register, whereby an image size can be selectively changed.

6. The parallel processor according to claim 5, wherein:

said first pointer is formed by connecting plural unit delay elements in series, and arranging a first selector and a second selector on an input side and on an output side of each of said unit delay elements, respectively, said first selector selecting and inputting the input data or the specified data into respective unit delay element, said second selector selecting said input data or output data and outputting it to a succeeding stage; and the states of selection of said plural first and second selectors are controlled respectively by said first pointer mode control means, to thus make it possible to shift said video signals through said first pointer in a selectively skipping manner.

7. The parallel processor according to claim 5, wherein:

said second pointer is formed by connecting plural unit delay elements in series, and arranging a first selector and a second selector on an input side and on an output side of each of said unit delay elements, respectively, said first selector selecting and inputting the input data or the specified data into respective unit delay element, said second selector selecting said input data or output data and outputting it to a succeeding stage; and the states of selection of said plural first and second selectors are controlled respectively by said second pointer mode control means, to thus make it possible to shift said video signals through said second pointer in a selectively skipping manner.

* * * * *